US009124491B2

(12) United States Patent
Kondo

(10) Patent No.: US 9,124,491 B2
(45) Date of Patent: Sep. 1, 2015

(54) INTERNET PROTOCOL (IP) NETWORK DEVICE, NETWORK SYSTEM, METHOD THEREOF

(71) Applicant: NEC CORPORATION, Tokyo (JP)

(72) Inventor: Takayuki Kondo, Tokyo (JP)

(73) Assignee: NEC CORPORATION, Tokyo (JP)

( * ) Notice: Subject to any disclaimer, the term of this patent is extended or adjusted under 35 U.S.C. 154(b) by 290 days.

(21) Appl. No.: 13/899,908

(22) Filed: May 22, 2013

(65) Prior Publication Data

US 2013/0326057 A1    Dec. 5, 2013

(30) Foreign Application Priority Data

May 30, 2012    (JP) .................................. 2012-123134

(51) Int. Cl.
*G06F 15/173* (2006.01)
*H04L 12/24* (2006.01)
(52) U.S. Cl.
CPC .......... *H04L 41/069* (2013.01); *H04L 41/0686* (2013.01); *H04L 41/0695* (2013.01)
(58) Field of Classification Search
CPC .............. H04L 41/069; H04L 41/0695; H04L 41/0686; H04L 29/06; G06F 15/173
See application file for complete search history.

(56) References Cited

U.S. PATENT DOCUMENTS

| 5,719,882 | A * | 2/1998 | Ellis ............................... 714/749 |
| 6,292,472 | B1 * | 9/2001 | Rariden et al. ................. 370/254 |
| 7,349,400 | B2 * | 3/2008 | Khirman ....................... 370/394 |
| 7,430,688 | B2 * | 9/2008 | Matsuno et al. ................. 714/31 |
| 7,492,764 | B2 * | 2/2009 | Cheng et al. ................... 370/389 |
| 7,898,939 | B2 * | 3/2011 | Lee et al. ....................... 370/216 |
| 8,391,137 | B2 * | 3/2013 | Omori ........................... 370/229 |
| 2002/0120730 | A1 * | 8/2002 | Goudzwaard et al. ........ 709/223 |

(Continued)

FOREIGN PATENT DOCUMENTS

JP    10-51476 A    2/1998
JP    2000-261548 A    9/2000

(Continued)

OTHER PUBLICATIONS

Search Report issued Sep. 3, 2013, by the International Searching Authority in corresponding International application No. PCT/JP2013/064814.

(Continued)

*Primary Examiner* — Philip Chea
*Assistant Examiner* — Gregory E Coxson
(74) *Attorney, Agent, or Firm* — Sughrue Mion, PLLC

(57) ABSTRACT

An internet protocol (IP) network device is provided including a detector adapted to detect an event in the internet protocol (IP) network device. The network device also includes a generator adapted to generate a trap message including event information having information about the detected event. The network device also includes a transmitter adapted to transmit, to an internet protocol (IP) network management device, the trap message including the event information and a first sequence indicator. The network device also includes a timer adapted to measure a time period from a time at which the transmitter transmits the trap information. If the measured time period is equal to or longer than a predetermined time, the generator generates an empty trap message and the transmitter transmits, to the network management device, the empty trap message and a second sequence indicator.

9 Claims, 11 Drawing Sheets

(56) References Cited

U.S. PATENT DOCUMENTS

| | | | |
|---|---|---|---|
| 2003/0126193 A1* | 7/2003 | Marklund et al. | 709/202 |
| 2006/0077988 A1* | 4/2006 | Cheng et al. | 370/401 |
| 2006/0129674 A1* | 6/2006 | Minegishi | 709/224 |
| 2012/0011414 A1* | 1/2012 | Nitta | 714/748 |
| 2013/0170391 A1* | 7/2013 | Feiten et al. | 370/252 |

FOREIGN PATENT DOCUMENTS

| | | |
|---|---|---|
| JP | 2001-160013 A | 6/2001 |
| JP | 2001-202305 A | 7/2001 |
| JP | 2003-244142 A | 8/2003 |
| JP | 2005-117371 A | 4/2005 |
| JP | 2006-94180 A | 4/2006 |
| JP | 2008-59114 A | 3/2008 |
| JP | 2010-218510 A | 9/2010 |

OTHER PUBLICATIONS

Written Opinion issued Sep. 3, 2013, by the International Searching Authority in corresponding International application No. PCT/JP2013/064814.

* cited by examiner

INTERNET PROTOCOL (IP) NETWORK DEVICE, NETWORK SYSTEM, METHOD THEREOF

BACKGROUND

Exemplary embodiments of the present invention relate to an Internet Protocol (IP) network, in particular, to a Network Management System (NMS) for an IP network based on a Simple Network Management Protocol (SNMP).

DESCRIPTION OF THE RELATED ART

In an IP network composed of a plurality of Network Elements (NEs) and an NMS that remotely monitors and controls individual NEs based on the SNMP, which is an Open Systems Interconnection (OSI) standard management protocol, if an event such as a failure detected by each NE occurs, the NMS is notified of a message called a trap that represents the event.

However, it is not certain that a trap (message) will reach the NMS. For example, if a communication failure occurs over a communication path between an NE and the NMS, while such a communication failure is occurring, a trap generated by the NE does not reach the NMS. Thus, there may be a trap that is lost in those that the NMS side receives.

To solve such a problem, a technique that detects a lost trap has been proposed as described in Japanese Patent Laid-Open No. 2003-244142 (Patent Literature 1).

FIG. 1 shows a procedure for a process of the lost trap detection technique. In this example, SNMP manager 100, which is an NMS, monitors SNMP agent 101, which is an NE.

Whenever an event occurs, SNMP agent 101 generates a trap, assigns a sequence number to the trap, and transmits the trap with the assigned sequence number to SNMP manager 100.

SNMP manager 100 receives traps from SNMP agent 101 and detects a lost trap based on the continuity of sequence numbers assigned to the traps. If there is a lost trap, SNMP manager 100 transmits a retransmission request for information about the lost trap to SNMP agent 101.

SNMP agent 101 retransmits information about the lost trap to SNMP manager 100 corresponding to the retransmission request received from SNMP manager 100. Thus, SNMP manager 100 can acquire information about the trap that SNMP manager 100 has not received due to a communication failure or the like.

However, according to the foregoing lost trap detection technique, a lost trap that has occurred is detected once SNMP manager 100 receives traps. Thus, if SNMP manager 100 has not received traps, it cannot determine whether it has not received a trap because the next event has not occurred in SNMP agent 101 or because a communication failure has occurred.

In addition, events infrequently occur in SNMP agent 101, so it infrequently transmits traps to SNMP manager 100. If the period between the time when an event occurs in SNMP agent 101 until the time when the next event occurs in SNMP agent 101 is long, SNMP manager 100 does not receive the next trap for a long time. In this case, SNMP manager 100 cannot recognize that a communication failure has occurred or that an event has occurred in SNMP agent 101 for a long time.

To solve the foregoing problem, according to the technique described in Patent Literature 1, SNMP manager 100 periodically checks whether or not a predetermined time has elapsed after it has received the last trap. If the predetermined period has elapsed, SNMP manager 100 asks SNMP agent 101 about the sequence number assigned to the last trap that SNMP agent 101 has transmitted.

In reply, SNMP agent 101 transmits the sequence number assigned to the last trap that SNMP agent 101 has transmitted to SNMP manager 100.

SNMP manager 100 checks whether or not the sequence number, in the reply from SNMP agent 101, matches the sequence number assigned to the last trap that SNMP manager 100 received. If they match each other, SNMP manager 100 determines that there is no lost trap. If they do not match each other, SNMP manager 100 determines that there is a lost trap due to a communication failure or the like.

According to Japanese Patent Laid-Open No. 2001-202305 (Patent Literature 2), if SNMP manager 100 has not received traps for a predetermined time or longer, SNMP manager 100 performs a heart-beat check for SNMP agent 101 in such a manner that SNMP manager 100 causes SNMP agent 101 to transmit traps to SNMP manager 100 at every predetermined period.

Specifically, SNMP manager 100 uses a timer that is reset whenever SNMP manager 100 receives a trap from SNMP agent 101 and determines that a heart-beat check has been successfully performed only when SNMP manager 100 has received a predetermined number of traps while the timer has not timed out. SNMP manager 100 can recognize a communication state based on the result of the heart-beat check.

SUMMARY

In the technique described in Patent Literature 1, a process composed of three steps is periodically executed in which SNMP manager 100 asks SNMP agent 101 about a sequence number, SNMP agent 101 transmits the sequence number to SNMP manager 100, and SNMP manager 100 determines whether there is a lost trap based on the sequence number. Thus, there is a problem in which the number of steps performed to detect a trap that has been lost after the last trap has been received increases.

According to the technique described in Patent Literature 2, if SNMP manager 100 has not received a trap, a process is executed that is composed of three steps in which SNMP manager 100 performs a heart-beat check for SNMP agent 101, SNMP agent 101 periodically transmits traps to SNMP manager 100, and SNMP manager 100 determines whether it has received traps in the foregoing manner. Thus, according to the technique described in Patent Literature 2, there is a problem in which the number of steps performed to detect a lost trap that has been lost after the last trap that has been received increases.

An object of certain exemplary embodiments of the invention is to solve the foregoing problem and to provide a network device, a network management device, a network management system, a trap transmission method, and a network management method that avoids increasing the number of processing steps to detect a lost trap.

To accomplish the foregoing object, an aspect of certain exemplary embodiments of the invention provides a network device, comprising:

an event detection section that detects an event that occurs in the own device; a trap generation/transmission section that generates a trap containing information about the event detected by said event detection section, assigns a sequence number to the trap, and transmits the trap with the assigned sequence number to an external network management device; and a trap information retransmission section that transmits information about a requested trap to said external network management device corresponding to a retransmission request received from said external network management device for information about a trap, wherein if the period after said trap is transmitted until the next trap is transmitted is equal to or longer than a predetermined time, said trap generation/transmission section periodically generates empty traps at least in the period, and assigns sequence numbers to the empty traps, and transmits the empty traps with the assigned sequence numbers to said external network management device.

Another aspect of certain exemplary embodiments of the invention provides a network management device, comprising:

a trap reception section that receives a trap containing information about an event from an external network device whenever it occurs therein and, if the period after an event occurs until the next event occurs is equal to or longer than a predetermined time, receives an empty trap at least in the period at every said predetermined time from said external network device;

a lost trap detection section that detects a lost trap based on the continuity of sequence numbers assigned to said traps and empty traps received by said trap reception section; and a trap information acquisition section that acquires information about a lost trap detected by said lost trap detection section.

A further aspect of certain exemplary embodiments of the invention provides a network management device, comprising:

a trap reception section that receives a trap containing information about an event from an external network device whenever it occurs therein and, if the period after an event occurs until the next event occurs is equal to or longer than a predetermined time, receives an empty trap at least in the period at every said predetermined time from said external network device;

a lost trap detection section that detects whether or not said traps and empty traps received by said trap reception section have been lost; and a trap information acquisition section that acquires information about a lost trap detected by said lost trap detection section.

wherein said lost trap detection section has a timer that measures a time longer than said predetermined time as a measured value in such a manner that the measured value is cleared at the time of the reception of each of said traps and empty traps, and wherein if the timer times out, said lost trap detection section determines that a lost trap has occurred.

A further aspect of certain exemplary embodiments of the invention provides a network management system, comprising:

a network device; and a network management device connected to the network device through a network, wherein said network device includes:

an event detection section that detects an event that occurs in the own device;

a trap generation/transmission section that generates a trap containing information about the event detected by said event detection section, assigns a sequence number to the trap, and transmits the trap with the assigned sequence number to said network management device; and a trap information retransmission section that transmits information about a requested trap to said network management device corresponding to a retransmission request received from said network management device for information about a trap, and wherein if the period after said trap is transmitted until the next trap is transmitted is equal to or longer than a predetermined time, said trap generation/transmission section periodically generates empty traps at least in the period, and assigns sequence numbers to the empty traps, and transmits the empty traps with the assigned sequence numbers to said network management device, wherein said network management device includes:

a trap reception section that receives said traps and empty traps from said network device;

a lost trap detection section that detects a lost trap based on the continuity of sequence numbers assigned to said traps and empty traps received by said trap reception section; and a trap information acquisition section that acquires information about a lost trap detected by said lost trap detection section.

A further aspect of certain exemplary embodiments of the invention provides a network management system, comprising:

a network device; and a network management device connected to the network device through a network, wherein said network device includes:

an event detection section that detects an event that occurs in the own device;

a trap generation/transmission section that generates a trap containing information about the event detected by said event detection section, assigns a sequence number to the trap, and transmits the trap with the assigned sequence number to said network management device; and a trap information retransmission section that transmits information about a requested trap to said network management device corresponding to a retransmission request received from said network management device for information about a trap, wherein if the period after said trap is transmitted until the next trap is transmitted is equal to or longer than a predetermined time, said trap generation/transmission section periodically generates empty traps at least in the period, and assigns sequence numbers to the empty traps, and transmits the empty traps with the assigned sequence numbers to said network management device, wherein said network management device includes:

a trap reception section that receives said traps and empty traps from said network device;

a lost trap detection section that detects whether or not said traps and empty traps received by said trap reception section have been lost; and a trap information acquisition section that acquires information about a lost trap detected by said lost trap detection section, wherein said lost trap detection section has a timer that measures a time longer than said predetermined time as a measured value in such a manner that the measured value is cleared at the time of the reception of each of said traps and empty traps, and wherein if the timer times out, said lost trap detection section determines that a lost trap has occurred.

A further aspect of certain exemplary embodiments of the invention provides a trap transmission method, comprising:

detecting an event that occurs in an own device;

generating a trap containing information about said event, assigning a sequence number to the trap, and transmitting the trap with the assigned sequence number to a network management device; and if the period after said trap is transmitted until the next trap is transmitted is equal to or longer than a predetermined time, periodically generating empty traps at least in the period, assigning sequence numbers to the empty traps, and transmitting the empty traps with the assigned sequence numbers to said network management device.

A further aspect of certain exemplary embodiments of the invention provides a network management method, comprising:

causing a network device to detect an event that occurs in the own device, to generate a trap containing information about said event, to assign a sequence number to the trap, to transmit the trap with the assigned sequence number to a network management device, if the period after said trap is transmitted until the next trap is transmitted is equal to or longer than a predetermined time, to periodically generate empty traps at least in the period, to assign sequence numbers to the empty traps, and to transmit the empty traps with the assigned sequence numbers to said network management device, and causing said network management device to receive said traps and empty traps from said network device, to detect a lost trap based on the continuity of the sequence numbers assigned to said traps and empty traps received from said network device, and if a lost trap is detected, to acquire information about the lost trap from said network device.

A further aspect of certain exemplary embodiments of the invention provides a network management method, comprising:

causing a network device to detect an event that occurs in the own device, to generate a trap containing information about said event, to assign a sequence number to the trap, to transmit the trap with the assigned sequence number to a network management device, if the period after said trap is transmitted until the next trap is transmitted is equal to or longer than a predetermined time, to periodically generate empty traps at least in the period, to assign sequence numbers to the empty traps, and to transmit the empty traps with the assigned sequence numbers to said network management device, and causing said network management device to receive said traps and empty traps from said network device, to determine that a lost trap has occurred if a timer that measures a time longer than said predetermined time as a measured value in such a manner that the measured value is cleared at the time of the reception of each of said traps and empty traps times out, and to acquire information about the lost trap from said network device.

One or more exemplary embodiments of the invention may avoid increasing of the number of processing steps. Also, one or more exemplary embodiments of the invention will detect a lost trap.

DETAILED DESCRIPTION

Exemplary embodiments of the invention will be described below with reference to the drawings. The word "exemplary" is used herein to mean "serving as an example, instance, or illustration". Any embodiment described herein as "exemplary" is not necessarily to be construed as preferred or advantageous over other embodiments.

First Exemplary Embodiment

Figure 1:
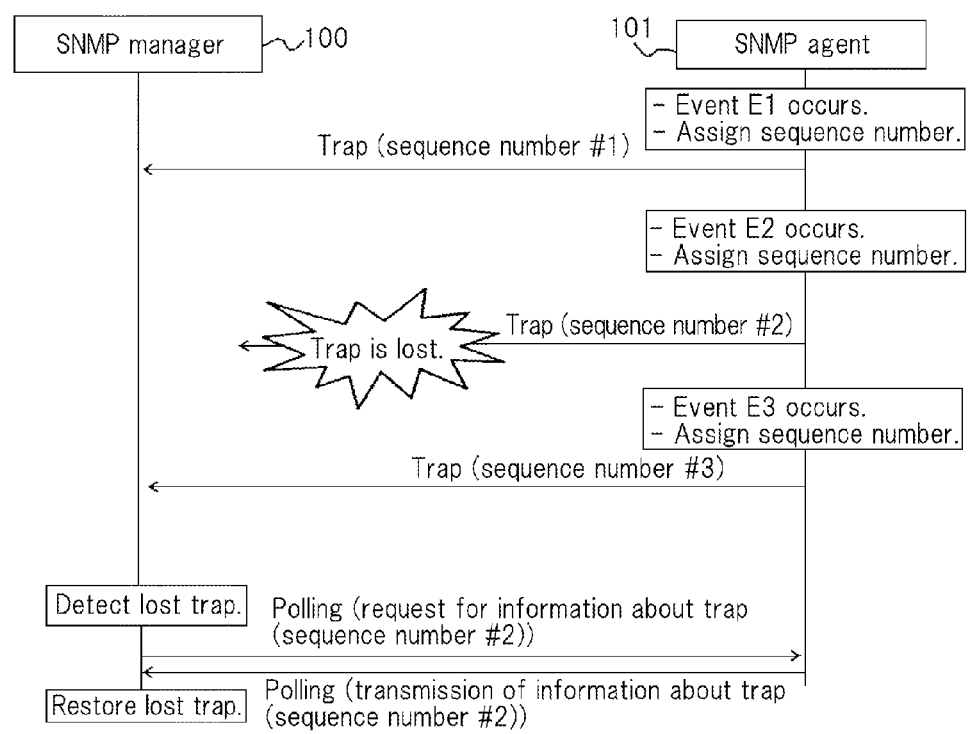
FIG. 1 is a schematic diagram describing an example of a lost trap detection technique.
Figure 2:
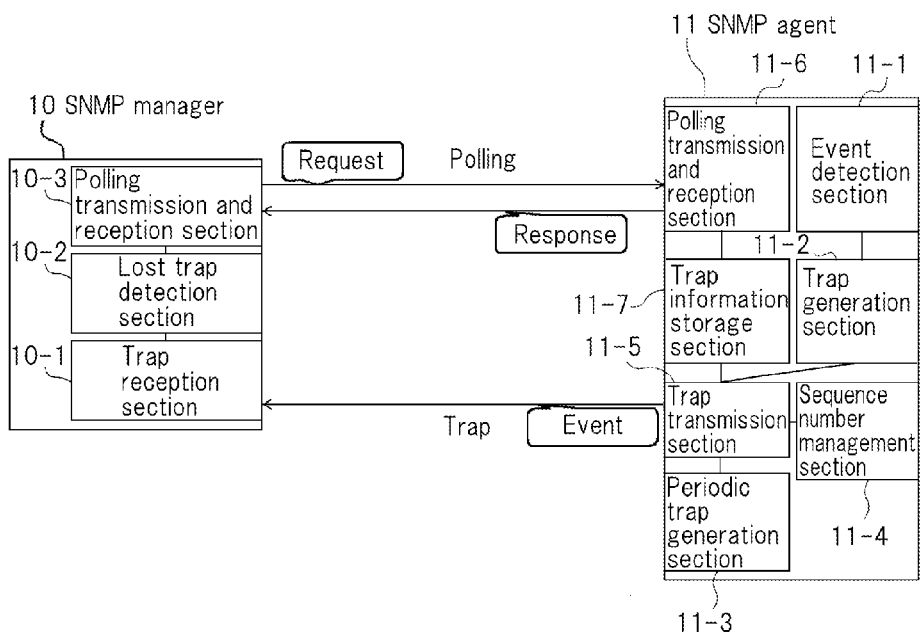
FIG. 2 is a block diagram showing the structure of a network management system according to a first embodiment.

FIG. 2 is a block diagram showing the structure of a network management system according to a first exemplary embodiment.

Referring to FIG. 2, the network management system is a system that manages an IP network based on the SNMP. The network management system has SNMP agent 11 that is a network device (also called NE) and SNMP manager 10 that is a network management device (also called NMS) and that remotely monitors and controls SNMP agent 11 based on the SNMP.

SNMP agent 11 and SNMP manager 10 can mutually communicate with each other through the IP network. FIG. 2 shows only one SNMP agent 11. It will be appreciated that the network management system may have a plurality of SNMP agents 11.

SNMP agent 11 has event detection section 11-1, trap generation section 11-2, periodic trap generation section 11-3, sequence number management section 11-4, trap transmission section 11-5, polling transmission and reception section 11-6, and trap information storage section 11-7.

Event detection section 11-1 detects an event that occurs in its own device. Trap generation section 11-2 generates a trap containing information about an event detected by event detection section 11-1.

If the period from just after one trap is transmitted until the next trap is transmitted (or the period from just after one event is detected until the next event is detected) is equal to or longer than a predetermined time, periodic trap generation section 11-3 generates an empty trap at every predetermined time at least in the period such that SNMP manager 10 can monitor SNMP agent 11.

Specifically, periodic trap generation section 11-3 has timer T1 that measures time t1 in such a manner that the measured value is reset at the time of the transmission of a trap. In this context, time t1 corresponds to the foregoing predetermined time. Periodic trap generation section 11-3 can determine whether or not the period from just after one trap is transmitted until the next trap is transmitted is equal to or longer than the predetermined time using timer T1.

Timer T1 may be cleared at the time of the detection of an event. In this case, periodic trap generation section 11-3 can determine whether or not the period from just after one event is detected until the next event is detected is equal to or longer than the predetermined time using timer T1.

Sequence number management section 11-4 assigns sequence numbers to traps generated by trap generation section 11-2 and to empty traps generated by periodic trap generation section 11-3 in the order that they are generated. These sequence numbers are indicators of elements in a sequence, in which a first sequence indicator immediately precedes a second sequence indicator in the sequence. Trap transmission section 11-5 transmits the traps and empty traps with assigned sequence indicators, in this case sequence numbers, to SNMP manager 10.

Trap information storage section 11-7 and polling transmission and reception section 11-6 constitute a trap information retransmission section that transmits information about a requested trap to SNMP manager 10. The transmitted information corresponds to a retransmission request received from SNMP manager 10 for information about a trap.

Specifically, trap information storage section 11-7 stores information about a trap (including sequence number and event information) generated by trap generation section 11-2. Polling transmission and reception section 11-6 receives a retransmission request for information about the trap from SNMP manager 10, acquires the information about the requested trap from trap information storage section 11-7 corresponding to the retransmission request, and transmits a reply containing the acquired information to SNMP manager 10.

Since information about empty traps is not stored in trap information storage section 11-7, if trap information storage section 11-7 has not stored information about the requested trap, polling transmission and reception section 11-6 transmits to SNMP manager 10a reply that contains information that denotes that a lost trap is an empty trap.

SNMP manager 10 has trap reception section 10-1, lost trap detection section 10-2, and polling transmission and reception section 10-3.

Trap reception section 10-1 receives a trap that contains information about an event and an empty trap from SNMP agent 11. Lost trap detection section 10-2 detects a lost trap based on the continuity of sequence numbers assigned to traps containing events and empty traps received by trap reception section 10-1.

When lost trap detection section 10-2 detects a lost trap, polling transmission and reception section 10-3, a trap information acquisition section, transmits a retransmission request for information about the lost trap to SNMP agent 11. In addition, polling transmission and reception section 10-3 receives information about the lost trap from SNMP agent 11 corresponding to the retransmission request.

Next, the operation of the network management system according to this embodiment will be described.

Figure 3:
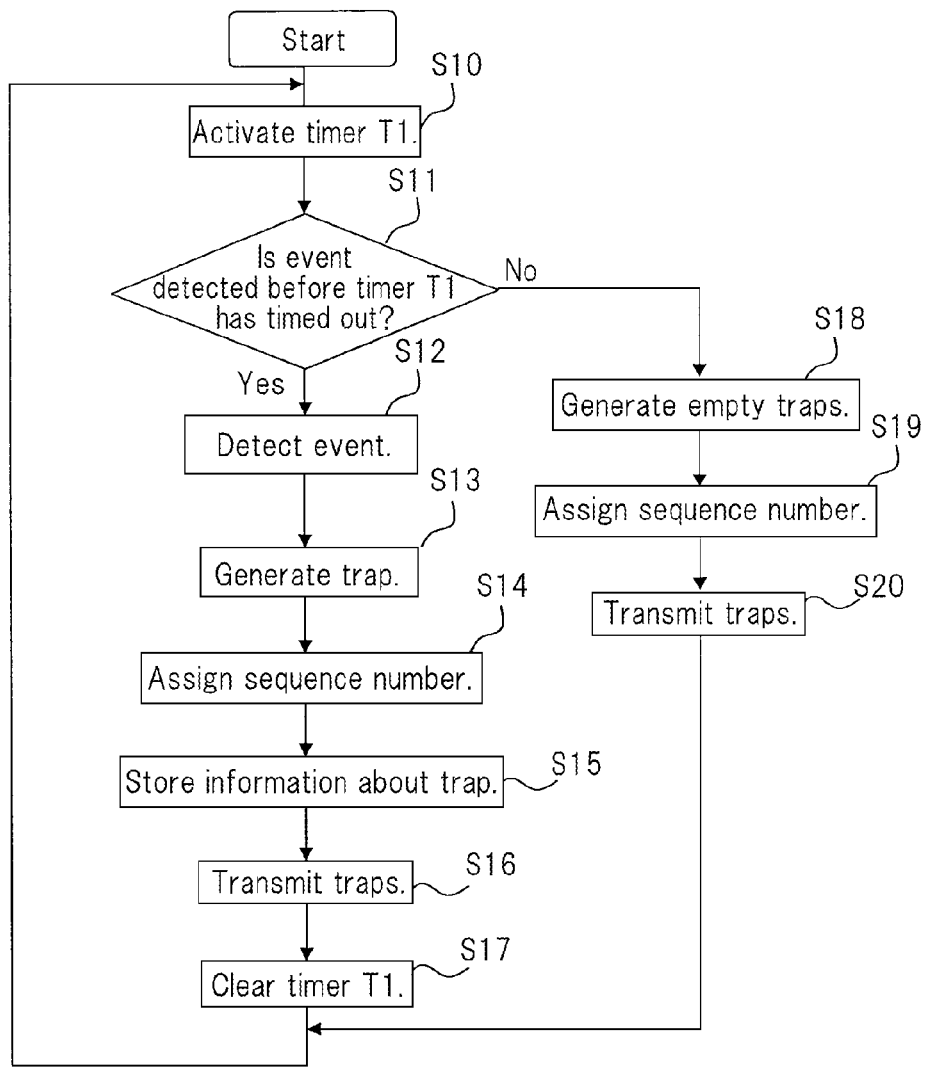
FIG. 3 is a flow chart showing a procedure for a trap transmission process that an SNMP agent of the network management system shown in FIG. 1 performs.

FIG. 3 is a flow chart showing a procedure for a trap transmission process that SNMP agent 11 performs.

At step S10, periodic trap generation section 11-3 activates timer T1. At step S11, periodic trap generation section 11-3 determines whether event detection section 11-1 has detected an event before timer T1 has timed out.

If the determined result at step S11 is "YES," the control advances to steps S12 to S17 of the process.

At step S12, event detection section 11-1 detects an event. At step S13, trap generation section 11-2 generates a trap containing information about the trap detected by event detection section 11-1.

At step S14, sequence number management section 11-4 assigns a sequence number to the trap generated by trap generation section 11-2. At step S15, trap information storage section 11-7 stores information about the trap (sequence number and event information.

At step S16, trap transmission section 11-5 transmits the trap with the assigned sequence number to SNMP manager 10. At step S17, periodic trap generation section 11-3 clears the counted value of timer T1 at the time of the transmission of the trap.

If the determined result at step S11 is "No," the control advances to step S18 to S20 of the process.

At step S18, periodic trap generation section 11-3 generates an empty trap. At step S19, sequence number management section 11-4 assigns a sequence number to the empty trap generated by periodic trap generation section 11-3.

At step S20, trap transmission section 11-5 transmits the empty trap with the assigned sequence number to SNMP manager 10. Thereafter, the control returns to step S10 of the process. When timer T1 times out, it returns to the initial state (namely, the counted value of timer T1 is cleared).

Figure 4:
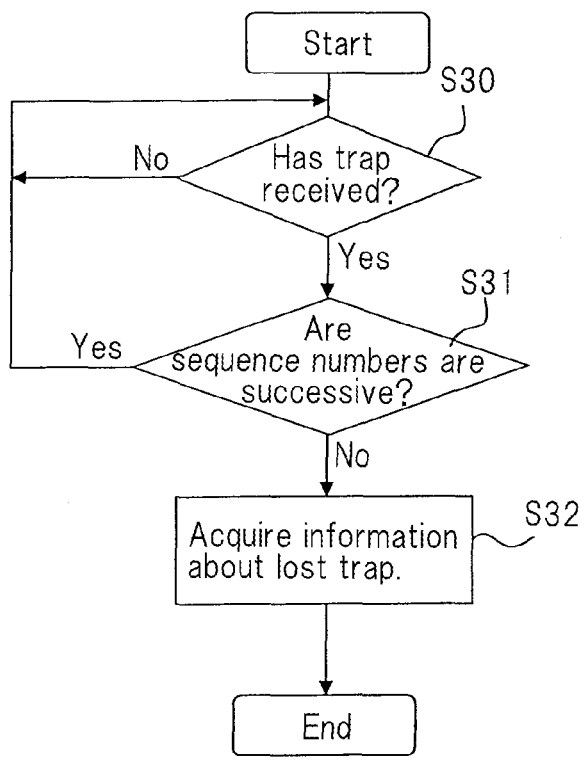
FIG. 4 is a flow chart showing a procedure for a lost trap detection process that an SNMP manager of the network management system shown in FIG. 1 performs.

FIG. 4 is a flow chart showing a procedure for a lost trap detection process that SNMP manager 10 performs.

At step S30, SNMP manager 10 determines whether or not trap reception section 10-1 has detected a trap.

If trap reception section 10-1 has detected a trap, the control advances to step S31 of the process. At step S31, SNMP manager 10 determines whether or not the sequence number assigned to the trap that has been detected this time and the sequence number assigned to the trap that has been received last time are successive.

If the sequence numbers are not successive, the control advances to step S32 of the process. At step S32, polling transmission and reception section 10-3 acquires information about a lost trap from SNMP agent 11.

Next, a trap transmission/lost trap detection process that the network management system performs will be described with a specific example.

Figure 5:
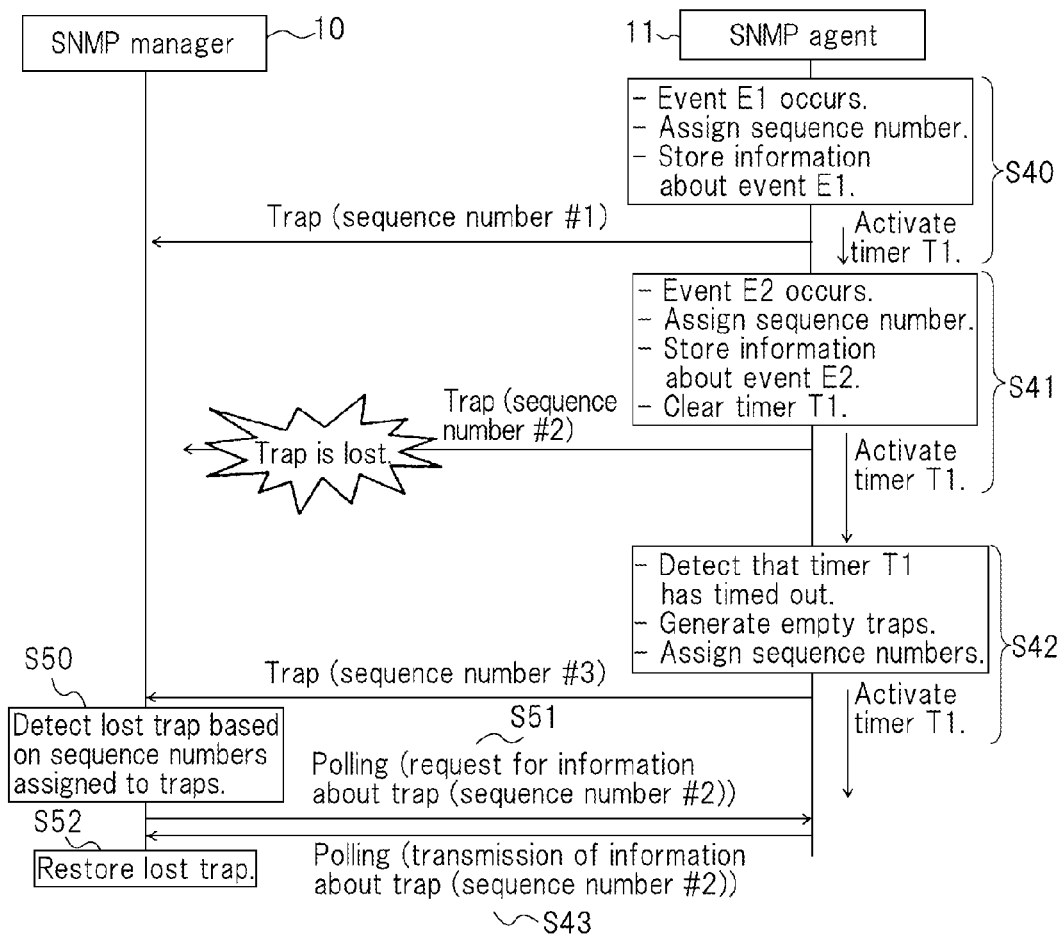
FIG. 5 is a schematic diagram describing a network management method that the network management system shown in FIG. 1 performs.

FIG. 5 shows a procedure for a process of a network management method (trap transmission/lost trap detection process). This procedure is performed if events E1 and E2 occur before timer T1 has timed out, a trap containing information about event E2 is lost, and then timer T1 times out. In FIG. 5, SNMP agent 11 performs steps S40 to S43 of the process, whereas SNMP manager 10 performs steps S50 to S52 of the process.

If event E1 occurs in SNMP agent 11, the control advances to step S40 of the process.

At step S40, event detection section 11-1 detects event E1. Trap generation section 11-2 generates a trap containing information about event E1. Sequence number management section 11-4 assigns sequence number #1 to the trap. Trap transmission section 11-5 transmits the trap with assigned sequence number #1 to SNMP manager 10. Trap information storage section 11-7 stores information about the trap with assigned sequence number #1. Periodic trap generation section 11-3 activates timer T1 at the time of the transmission of the trap with assigned sequence number #1.

If event E2 occurs in SNMP agent 11 before timer T1 has timed out, the control advances to step S41 of the process.

At step S41, event detection section 11-1 detects event E2. Trap generation section 11-2 generates a trap containing information about event E2. Sequence number management section 11-4 assigns sequence number #2 to the trap. Trap transmission section 11-5 transmits the trap with assigned sequence number #2 to SNMP manager 10. Trap information storage section 11-7 stores information about the trap with assigned sequence number #2. Periodic trap generation section 11-3 clears the measured value of timer T1 and activates timer T1 at the time of the transmission of the trap with assigned sequence number #2.

If timer T1 times out before the next event E3 has occurred, the control advances to step S42 of the process.

At step S42, periodic trap generation section 11-3 detects that timer T1 has timed out and generates an empty trap. Sequence number management section 11-4 assigns sequence number #3 to the empty trap. Trap transmission section 11-5 transmits the empty trap with assigned sequence number #3 to SNMP manager 10. Periodic trap generation section 11-3 activates timer T1 at the time of the transmission of the empty trap with assigned sequence number #3.

In the example shown in FIG. 5, the trap with assigned sequence number #2 has been lost due to a communication failure or the like. Thus, in SNMP manager 10, trap reception section 10-1 receives the trap with assigned sequence number #1 and the empty trap with assigned sequence number #3.

At step S50, lost trap detection section 10-2 determines that a trap with assigned sequence number #2 has been lost based on the continuity of the sequence numbers (#1 and #3) assigned to the traps received by trap reception section 10-1.

At step S51, polling transmission and reception section 10-3 transmits a retransmission request for information about the trap with assigned sequence number #2 to SNMP agent 11.

At step S43, polling transmission and reception section 11-6 receives the retransmission request from SNMP manager 10, acquires information about the requested trap with assigned sequence number #2 from trap information storage section 11-7 corresponding to the retransmission request, and transmits a reply containing the acquired information to SNMP manager 10.

At step S52, polling transmission and reception section 10-3 receives information about the retransmitted trap with assigned sequence number #2 from SNMP agent 11. As a result, the lost trap can be restored.

According to the foregoing network management method, if the period after one transmission is transmitted until the next trap is transmitted is equal to or longer than the predetermined time, SNMP agent 11 transmits an empty trap with an assigned sequence number to SNMP manager 10 at every predetermined time. Thus, if SNMP manager 10 has not received a trap containing information about an event, SNMP manager 10 checks the continuity of sequence numbers assigned to empty traps so as to determine whether SNMP manager 10 has not received the next trap because it has not occurred or because a communication failure has occurred.

According to this embodiment, since it is not necessary to ask for and reply to sequence numbers as described in Patent Literature 1 and to perform heart-beat check as described in Patent Literature 2, the number of processing steps can be decreased compared with those described in Patent Literatures 1 and 2.

Second Exemplary Embodiment

Although a network management system according to a second exemplary embodiment has the structure shown in FIG. 2, the network management system according to the second embodiment is different from the first embodiment in that lost trap detection section 10-2 has timer T2 that measures time t2 (>t1) in such a manner that the measured value is cleared at the time of the reception of a trap and lost trap detection section 10-2 detects a lost trap depending on whether or not timer T2 has timed out. Like timer T1, if timer T2 times out, it returns to the initial state (namely, the measured value is cleared).

Since a trap transmission process that SNMP agent 11 according to the second embodiment performs is the same as that according to the first embodiment, its description will be omitted.

Figure 6:
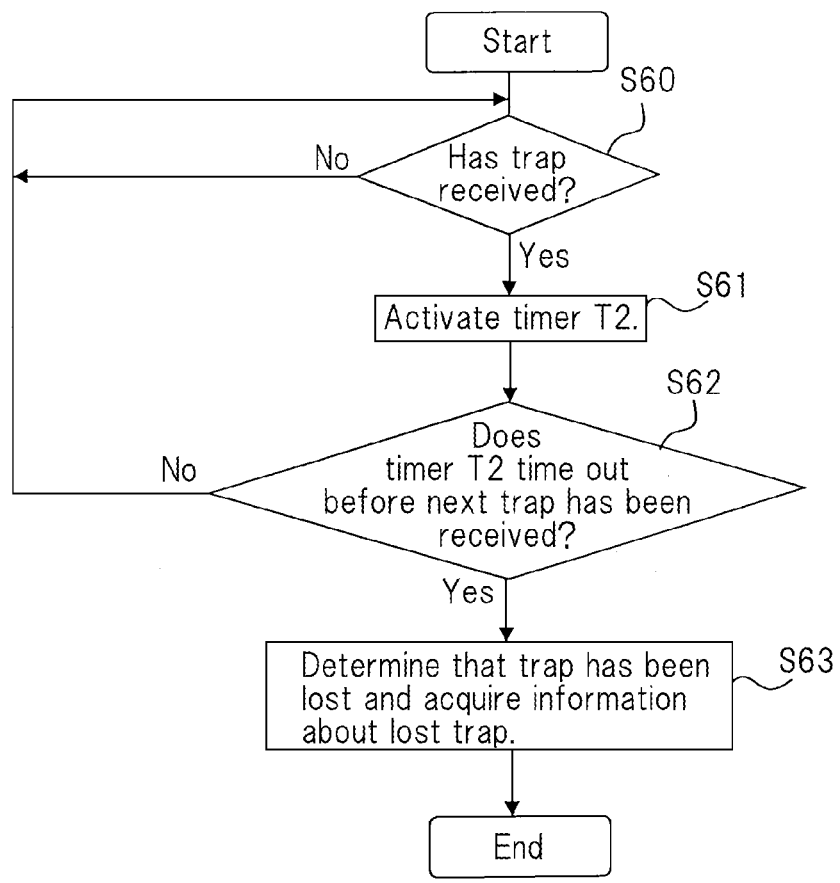
FIG. 6 is a flow chart showing a procedure for a lost trap detection process that an SNMP manager of a network management system according to a second embodiment.

FIG. 6 is a flow chart showing a procedure for a lost trap detection process that SNMP manager 10 performs.

At step S60, SNMP manager 10 determines whether or not trap reception section 10-1 has received a trap.

If trap reception section 10-1 has received a trap, the control advances to step S61 of the process. At step S61, lost trap detection section 10-2 activates timer T2.

At step S62, lost trap detection section 10-2 determines whether or not timer T2 has timed out before trap reception section 10-1 has received the next trap.

If timer T2 has timed out before trap reception section 10-1 has received the next trap, the control advances to step S63 of the process. At step S63, lost trap detection section 10-2 determines that a lost trap has occurred. Polling transmission and reception section 10-3 acquires information about the lost trap from SNMP agent 11.

If the determined result at step S60 is "No" or the determined result at step S62 is "No," the control returns to step S60 of the process Since it is likely that a plurality of traps have been lost, at step S63, polling transmission and reception section 10-3 acquires information about all traps transmitted from SNMP agent 11 after polling transmission and reception section 10-3 has received the last trap from SNMP agent 11.

Next, a process of a network management method (trap transmission/lost trap detection process) that the network management system performs will be described with a specific example.

Figure 7:
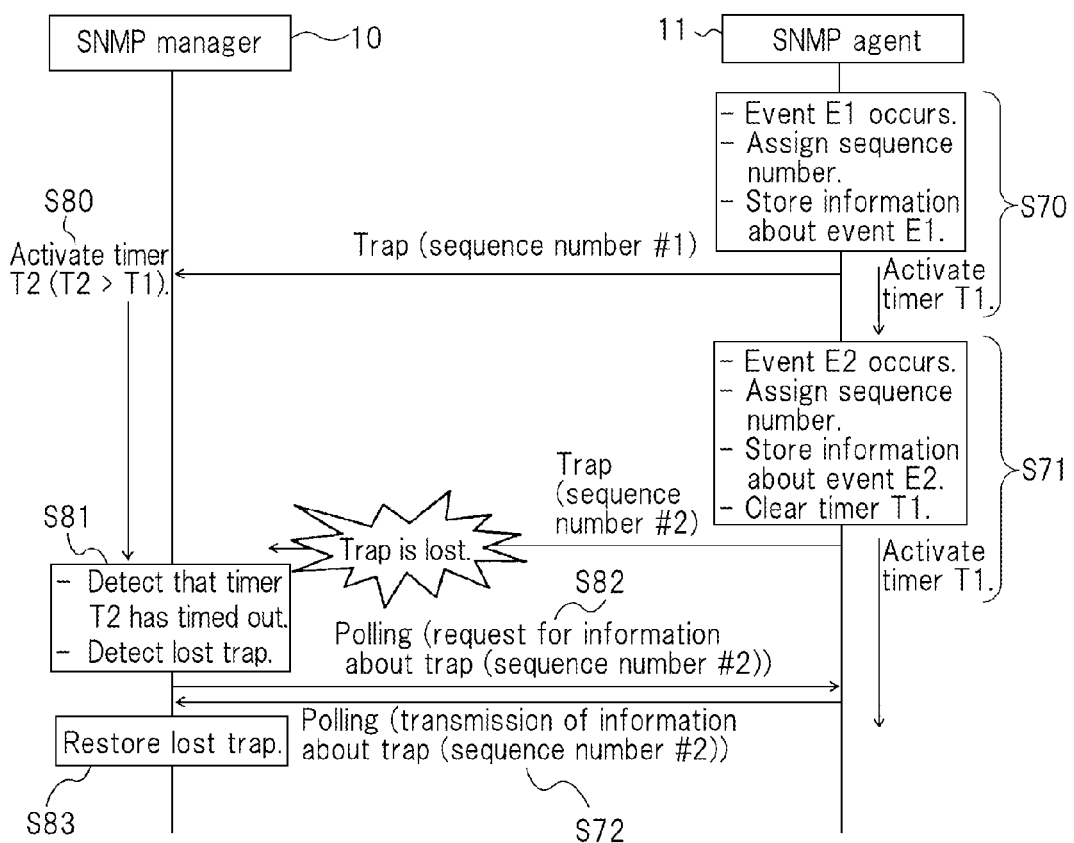
FIG. 7 is a schematic diagram describing a network management method that the network management system according to the second embodiment performs.

FIG. 7 shows a procedure for the process of the network management method. This procedure is performed if events E1 and E2 occur before timer T1 has timed out and then a trap containing information about event E2 is lost. In FIG. 7, SNMP agent 11 performs steps S70 to S72 of the process, whereas SNMP manager 10 performs steps S80 to S83 of the process.

If event E1 occurs in SNMP agent 11, the control advances to step S70 of the process.

At step S70, event detection section 11-1 detects event E1. Trap generation section 11-2 generates a trap containing information about event E1. Sequence number management section 11-4 assigns sequence number #1 to the trap. Trap transmission section 11-5 transmits the trap with assigned sequence number #1 to SNMP manager 10. Trap information storage section 11-7 stores information about the trap with assigned sequence number #1. Periodic trap generation section 11-3 activates timer T1 at the time of the transmission of the trap with assigned sequence number #1.

If event E2 occurs in SNMP agent 11 before timer T1 has timed out, the control advances to step S71 of the process.

At step S71, event detection section 11-1 detects event E2. Trap generation section 11-2 generates a trap containing information about event E2. Sequence number management section 11-4 assigns sequence number #2 to the trap. Trap transmission section 11-5 transmits the trap with assigned sequence number #2 to SNMP manager 10. Trap information storage section 11-7 stores information about the trap with assigned sequence number #2. Periodic trap generation section 11-3 resets the measured value and activates timer T1 at the time of the transmission of the trap with assigned sequence number #2.

When trap reception section 10-1 receives the trap with assigned sequence number #2, the control advances to step S80 of the process. At step S80, lost trap detection section 10-2 activates timer T2 at the time of the reception of the trap with assigned sequence number #1.

In the example shown in FIG. 7, a trap with assigned sequence number #2 has been lost due to a communication failure or the like. Thus, in SNMP manager 10, trap reception section 10-1 cannot receive the trap with assigned sequence number #2. As a result, timer T2 times out. Thereafter, the control advances to step S81 of the process.

At step S81, lost trap detection section 10-2 detects that timer T2 has timed out and determines that the trap with assigned sequence number #2 has been lost.

At step S82, polling transmission and reception section 10-3 transmits a retransmission request for information about the trap with assigned sequence number #2 to SNMP agent 11.

At step S72, polling transmission and reception section 11-6 receives the retransmission request from SNMP manager 10, acquires information about the trap with assigned sequence number #2 from trap information storage section 11-7, and transmits a reply containing the acquired information to SNMP manager 10.

At step S83, polling transmission and reception section 10-3 receives information about the trap with assigned sequence number #2 from SNMP agent 11. Thus, the lost trap can be restored.

According to the foregoing network management method, SNMP agent 11 transmits a trap containing information about an event with an assigned sequence number to SNMP manager 10. In addition, if the period from just after one trap is transmitted until the next trap is transmitted is equal to or longer than the predetermined time, SNMP agent 11 transmits an empty trap with an assigned sequence number to SNMP manager 10 at every predetermined time. Unless a communication failure has occurred, SNMP manager 10 has received a trap containing information about an event with an assigned sequence number or an empty trap with an assigned sequence number in the predetermined time. Thus, if SNMP manager 10 has received neither a trap containing information about an event nor an empty trap for the predetermined time, it is likely that a trap has been lost due to a communication failure or the like. If SNMP manager 10 has received neither a trap containing information about an event nor an empty trap and timer T2 has timed out, SNMP manager 10 can determine that a trap has been lost due to a communication failure or the like based on such a theory. According to the lost trap detection process using timer T2, if SNMP manager 10 has not received a trap containing information about an event, SNMP manager 10 can determine whether it has not received the next trap because it has not occurred or because a communication failure or the like has occurred.

According to this embodiment, since it is not necessary to ask for and reply to sequence numbers as described in Patent Literature 1 and to perform a heart-beat check as described in Patent Literature 2, the number of processing steps can be decreased compared with those described in Patent Literatures 1 and 2.

Third Exemplary Embodiment

Although a network management system according to a third exemplary embodiment has the structure shown in FIG. 2, the network management system according to the third embodiment is different from that according to the first embodiment in that periodic trap generation section 11-3 generates an empty trap at every time t using timer T1 regardless of occurrence of an event.

Since a lost trap detection process that SNMP manager 10 according to the third embodiment performs is the same as that according to the first embodiment, its description will be omitted.

Figure 8:
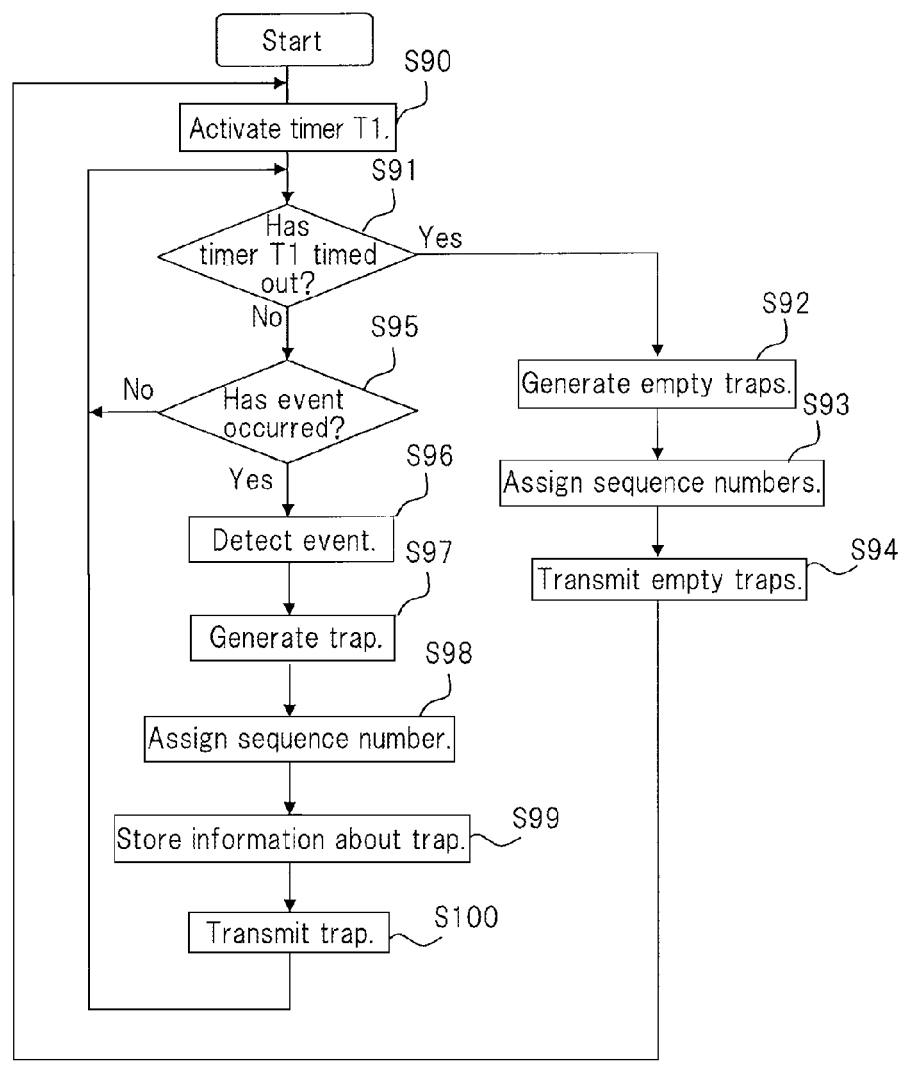
FIG. 8 is a flow chart showing a procedure for a trap transmission process that an agent of a network management system according to a third embodiment performs.

FIG. 8 is a flow chart showing a procedure for a trap transmission process that SNMP agent 11 performs.

At step S90, periodic trap generation section 11-3 activates timer T1. At step S91, periodic trap generation section 11-3 determines whether or not timer T1 has timed out.

If the determined result at step S91 is "Yes," the control advances to steps S92 to S94 of the process.

At step S92, periodic trap generation section 11-3 generates an empty trap. At step S93, sequence number management section 11-4 assigns a sequence number to the empty trap generated by periodic trap generation section 11-3.

At step S94, trap transmission section 11-5 transmits the empty trap with the assigned sequence number to SNMP manager 10.

After step S94, the control returns to step S90 of the process.

If the determined result at step S91 is "No," the control advances to steps S95 to S100 of the process.

At step S95, event detection section 11-1 determines whether an event has occurred. If an event has not occurred, the control returns to step S91 of the process.

If an event has occurred, the control advances to step S96 of the process. At step S96, event detection section 11-1 detects an event. At step S97, trap generation section 11-2 generates a trap containing information about the event detected by event detection section 11-1.

At step S98, sequence number management section 11-4 assigns a sequence number to the trap generated by trap generation section 11-2. At step S99, trap information storage section 11-7 stores information about the trap (sequence number and information about the event).

At step S100, trap transmission section 11-5 transmits the trap with the assigned sequence number to SNMP manager 10.

After step S100, the control returns to step S91 of the process.

Next, a process of a network management method that the network management system according to this embodiment performs will be described with a specific example.

Figure 9:
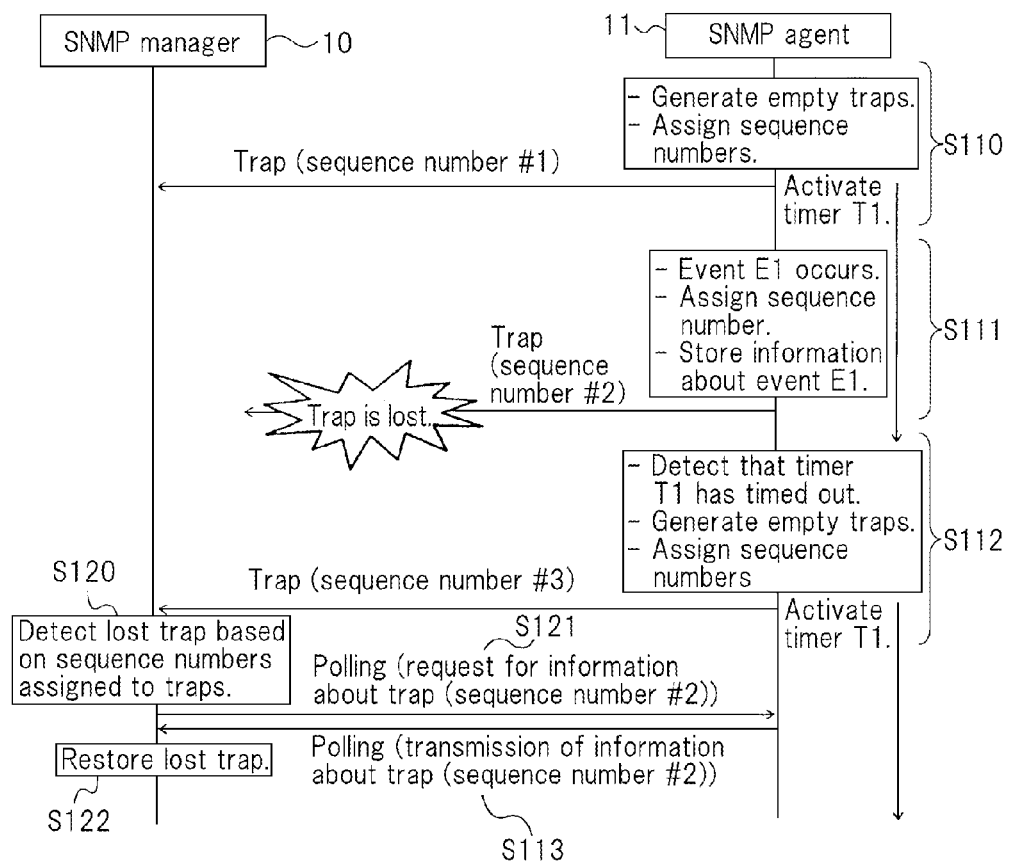
FIG. 9 is a schematic diagram describing a network management method that the network management system according to the third embodiment performs.

FIG. 9 shows the procedure for the process of the network management method. This procedure is performed if an empty trap is generated, event E1 occurs before timer T1 has timed out, a trap containing information about event E1 is lost, and then timer T1 times out. In FIG. 9, SNMP agent 11 performs steps S110 to S113 of the process, whereas SNMP manager 10 performs steps S120 to S122 of the process.

At step S110, periodic trap generation section 11-3 generates an empty trap. Sequence number management section 11-4 assigns sequence number #1 to the empty trap. Trap Transmission section 11-5 transmits the empty trap with assigned sequence number #1 to SNMP manager 10. Periodic trap generation section 11-3 activates timer T1 at the time of the transmission of the empty trap with assigned sequence number #1.

If event E1 occurs in SNMP agent 11 before timer T1 has timed out, the control advances to step S111 of the process.

At step S111, event detection section 11-1 detects event E1. Trap generation section 11-2 generates a trap containing information about event E1. Sequence number management section 11-4 assigns sequence number #2 to the trap. Trap information storage section 11-7 stores information about the trap with assigned sequence number #2. Trap transmission section 11-5 transmits the trap with assigned sequence number #2 to SNMP manager 10.

If timer T1 times out before the next event E2 has occurred, the control advances to step S112 of the process.

At step S112, periodic trap generation section 11-3 detects that timer T1 has timed out and generates an empty trap. Sequence number management section 11-4 assigns sequence number #3 to the empty trap. Trap transmission section 11-5 transmits the empty trap with assigned sequence number #3 to SNMP manager 10. Periodic trap generation section 11-3 activates timer T1 at the time of the transmission of the empty trap with assigned sequence number #3.

In the example shown in FIG. 9, the trap with sequence number #2 has been lost due to communication failure or the like. Thus, in SNMP manager 10, trap reception section 10-1 receives the empty trap with assigned sequence number #1 and the empty trap with assigned sequence number #3.

At step S120, lost trap detection section 10-2 determines that the trap with assigned sequence number #2 has been lost based on the continuity of the sequence numbers (#1 and #3) assigned to the traps received by trap reception section 10-1.

At step S121, polling transmission and reception section 10-3 transmits a retransmission request for information about the trap with assigned sequence number #2 to SNMP agent 11.

At step S113, polling transmission and reception section 11-6 receives the retransmission request from SNMP manager 10, acquires information about the requested trap with assigned sequence number #2 from trap information storage section 11-7 corresponding to the retransmission request, and transmits a reply containing the acquired information to SNMP manager 10.

At step S122, polling transmission and reception section 10-3 receives the retransmitted information about the trap with assigned sequence number #2 from SNMP agent 11. As a result, the lost trap can be restored.

According to the foregoing network management method, SNMP agent 11 transmits a trap containing information about an event with an assigned sequence number to SNMP manager 10. In addition, SNMP agent 11 transmits an empty trap with an assigned sequence number to SNMP manager 10 at every predetermined time. Unless a communication failure has occurred, SNMP manager 10 has received not only a trap containing information about an event, but also an empty trap with an assigned sequence number at every predetermined time. Thus, if SNMP manager 10 has not received a trap containing information about an event, SNMP manager 10 can determine whether it has not received the next trap because it has not occurred or because a communication failure or the like has occurred.

According to this embodiment, since it is not necessary to ask for and reply to sequence numbers as described in Patent Literature 1 and to perform a heart-beat check as described in Patent Literature 2, the number of processing steps can be decreased compared with those described in Patent Literatures 1 and 2.

Fourth Exemplary Embodiment

Although a network management system according to a fourth exemplary embodiment has the structure shown in FIG. 2, the network management system according to the fourth embodiment is different from that according to the third embodiment in that lost trap detection section 10-2 has timer T2 that measures time t2 (>t1) in such a manner that the counted value is cleared at the time of the reception of a trap and lost trap detection section 10-2 detects a lost trap depending on whether or not timer T2 has timed out.

A trap transmission process that SNMP agent 11 performs according to this embodiment is the same as that according to the third embodiment. A lost trap detection process that SNMP manager 10 according to the fourth embodiment performs is the same as that according to the second embodiment.

Next, a process of a network management method (trap transmission/lost trap detection process) that the network management system according to this embodiment performs will be described with a specific example.

Figure 10:
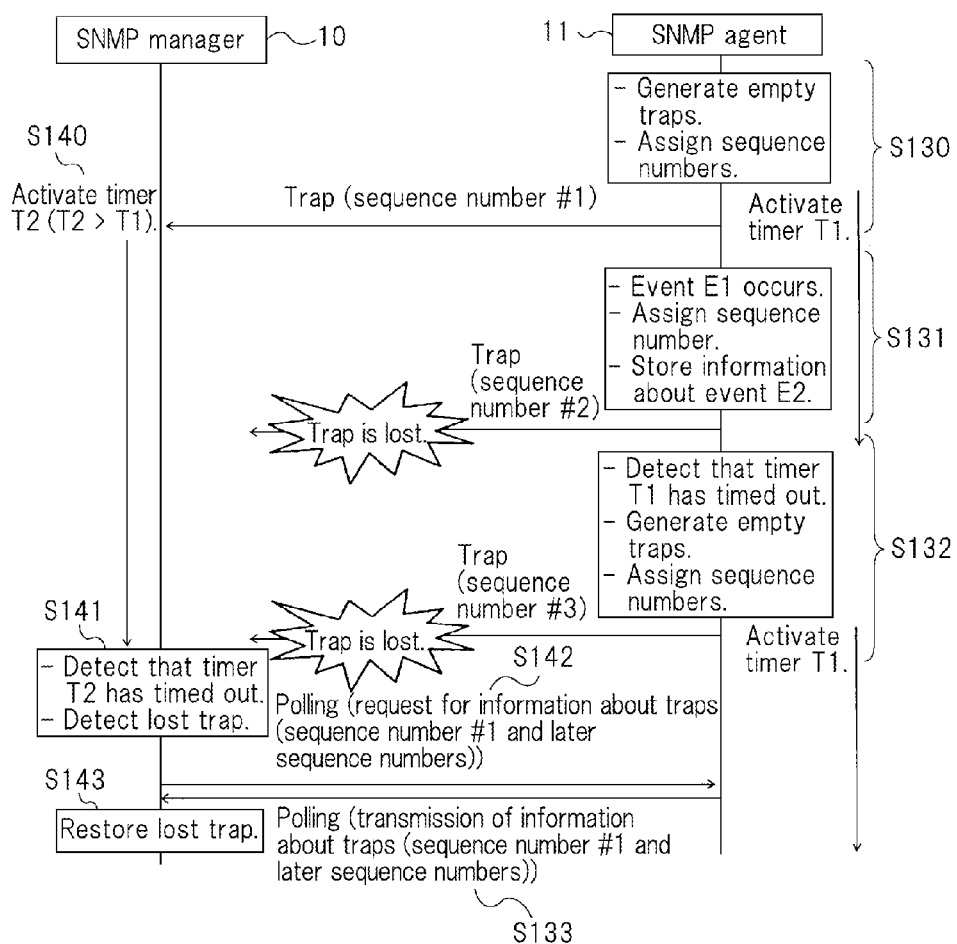
FIG. 10 is a schematic diagram describing a network management method that a network management system according to a fourth embodiment performs.

FIG. 10 shows the procedure for the process of the network management method. This procedure is performed if an empty trap is generated, event E1 occurs before timer T1 has timed out, both a trap containing information about event E1 and an empty trap that has been transmitted are lost, and then timer T1 times out. In FIG. 10, SNMP agent 11 performs steps S130 to S133 of the process, whereas SNMP manager 10 performs steps S140 to S143 of the process.

At step S130, periodic trap generation section 11-3 generates an empty trap. Sequence number management section 11-4 assigns sequence number #1 to the empty trap. Trap Transmission section 11-5 transmits the empty trap with assigned sequence number #1 to SNMP manager 10. Periodic trap generation section 11-3 activates timer T1 at the time of the transmission of the empty trap with assigned sequence number #1.

If event E1 occurs in SNMP agent 11 before timer T1 has timed out, the control advances to step S131 of the process.

At step S131, event detection section 11-1 detects event E1. Trap generation section 11-2 generates a trap containing information about event E1. Sequence number management section 11-4 assigns sequence number #2 to the trap. Trap information storage section 11-7 stores information about the trap with assigned sequence number #2. Trap transmission section 11-5 transmits the trap with assigned sequence number #2 to SNMP manager 10.

If timer T1 times out before the next event E2 has occurred, the control advances to step S132 of the process.

At step S132, periodic trap generation section 11-3 detects that timer T1 has timed out and generates an empty trap. Sequence number management section 11-4 assigns sequence number #3 to the empty trap. Trap transmission section 11-5 transmits the empty trap with assigned sequence number #3 to SNMP manager 10. Periodic trap generation section 11-3 activates timer T1 at the time of the transmission of the empty trap with assigned sequence number #3.

When trap reception section 10-1 receives the empty trap with assigned sequence number #1, the control advances to step S140 of the process. At step S140, lost trap detection section 10-2 activates timer T2 at the time of the reception of the empty trap with assigned sequence number #1.

In the example shown in FIG. 10, since the trap with assigned sequence number #2 and the empty trap with assigned sequence number #3 have been lost due to a communication failure or the like, in SNMP manager 10, trap reception section 10-1 cannot receive the trap with assigned sequence number #2 and the empty trap with assigned sequence number #1. As a result, timer T2 times out.

At step S141, lost trap detection section 10-2 detects that timer T2 has timed out and determines that traps with sequence number #1 and later sequence numbers have been lost.

At step S142, polling transmission and reception section 10-3 transmits a retransmission request for information about the traps with assigned sequence number #1 and later sequence numbers to SNMP agent 11.

At step S133, polling transmission and reception section 11-6 receives the retransmission request from SNMP manager 10, acquires information about the requested traps with assigned sequence number #1 and later sequence numbers from trap information storage section 11-7 corresponding to the retransmission request, and transmits a reply containing the acquired information to SNMP manager 10.

At step S143, polling transmission and reception section 10-3 receives the retransmitted information about the traps with assigned sequence number #1 and later sequence numbers from SNMP agent 11. As a result, the lost traps can be restored.

According to the foregoing network management method, SNMP agent 11 transmits a trap containing information about an event with an assigned sequence number to SNMP manager 10. SNMP agent 11 transmits an empty trap with an assigned sequence number to SNMP manager 10 at every predetermined time. Unless a communication failure has occurred, SNMP manager 10 has received a trap containing information about an event with an assigned sequence number or an empty trap with an assigned sequence number in the predetermined time. Thus, if SNMP manager 10 has not received a trap containing information about an event or an empty trap for the predetermined time or longer, it is likely that a trap has been lost due to a communication failure or the like. If SNMP manager 10 has not received a trap containing information about an event or an empty trap and timer T2 has timed out, SNMP manager 10 can determine that a trap has been lost due to a communication failure or the like based on such a theory. According to the lost trap detection process using timer T2, if SNMP manager 10 has not received a trap containing information about an event, SNMP manager 10 can determine that the reason why it is not received the next trap is because it is has not occurred, or the reason why it has not received the next trap is because a communication failure or the like has occurred.

According to this embodiment, since it is not necessary to ask for and reply to sequence numbers as described in Patent Literature 1 and to perform a heart-beat check as described in Patent Literature 2, the number of processing steps can be decreased compared with those described in Patent Literatures 1 and 2.

The foregoing embodiments are exemplary embodiments of the invention. However, it should be understood by those skilled in the art that the structure and details of the exemplary embodiments may be changed in various manners without departing from the scope of the present invention.

For example, in the structure shown in FIG. 2, trap transmission section 11-5 may have the function of trap generation section 11-2.

Alternatively, trap transmission section 11-5 may have the functions of trap generation section 11-2 and periodic trap generation section 11-3.

As another alternative, trap transmission section 11-5 may have the functions of trap generation section 11-2, periodic trap generation section 11-3, and sequence number management section 11-4.

Another Exemplary Embodiment

Figure 11:
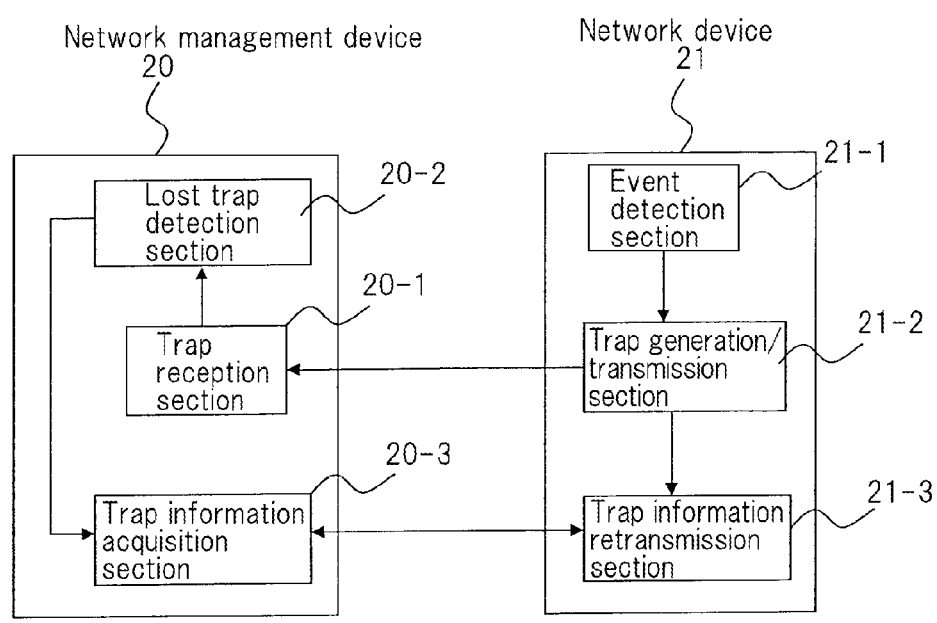
FIG. 11 is a block diagram showing the structure of a network management system according to another embodiment performs.

FIG. 11 is a block diagram showing the structure of a network management system according to another exemplary embodiment.

Referring to FIG. 11, the network management system is a system that manages an IP network based on the SNMP. The network management system has network device 21 that is an NE and network management device 20 that is an NMS that remotely monitors and controls network device 21 based on the SNMP. FIG. 11 shows only one network device 21. However, it should be appreciated that network device 21 may have a plurality of network devices 21.

Network device 21 has event detection section 21-1 that detects an event that occurs in the own device; trap generation/transmission section 21-2 that generates a trap containing information about an event detected by event detection section 21-1, assigns a sequence number to the trap, and transmits the trap with the assigned sequence number to network management device 20; and trap information retransmission section 21-3 that transmits information about a requested trap to network management device 20 corresponding to a retransmission request received from network management device 20 for the information about the trap.

If the period from just after one trap is transmitted until the next trap is transmitted is equal to or longer than a predetermined time, trap generation/transmission section 21-2 periodically generates empty traps at least in the period, assigns sequence numbers to the empty traps, and transmits the empty traps with the assigned sequence numbers to network management device 20.

Network management device 20 has trap reception section 20-1 that receives traps containing information about events and empty traps from network device 21; lost trap detection section 20-2 that detects a lost trap based on the continuity of sequence numbers assigned to traps containing information about events and empty traps received by trap reception section 20-1; and trap information acquisition section 20-3 that transmits a retransmission request for information about the lost trap detected by lost trap detection section 20-2 to network device 21 and acquires the information about the lost trap from network device 21.

In the foregoing structure, trap generation/transmission section 21-2 has a timer that measures a predetermined time in such a manner that the measured value is cleared at the time of the transmission of a trap. If the timer times out before event detection section 21-1 detects an event, trap generation/transmission section 21-2 may generate empty traps.

Alternatively, trap generation/transmission section 21-2 may have a timer that measures a predetermined time. If the timer times out, trap generation/transmission section 21-2 may generate empty traps.

As another alternative, lost trap detection section 20-2 may have a timer that measures a time longer than the predetermined time in such a manner that the measured value is cleared at the time of the reception of a trap containing information about an event or an empty trap. If the timer times out, lost trap detection section 20-2 may determine that a lost trap has occurred.

The present application claims a priority based on Japanese Patent Application JP 2012-123134 filed on May 30, 2012, the entire contents of which being incorporated herein by reference in its entirety.

It should be noted that the present inventive concept is not limited to the above exemplary embodiments but modification can be made as needed without deviating from the spirit and scope as defined by the claims.

What is claimed is:

1. An internet protocol (IP) network device, comprising:
a detector adapted to detect an event in the internet protocol (IP) network device;

a generator adapted to generate a trap message comprising event information having information about the detected event;

a transmitter adapted to transmit, to an internet protocol (IP) network management device, the trap message comprising the event information and a first sequence indicator; and a timer adapted to measure a time period from a time at which the transmitter transmits the trap information;

wherein if the measured time period is equal to or longer than a predetermined time, the generator generates an empty trap message, and the transmitter transmits, to the internet protocol (IP) network management device, the empty trap message and a second sequence indicator.

2. The internet protocol (IP) network device according to claim 1, wherein the empty trap message does not include information about the event.

3. The internet protocol (IP) network device according to claim 1, wherein the first sequence indicator and the second sequence indicator are elements of a sequence and the first sequence indicator immediately precedes the second sequence indicator in the sequence.

4. The internet protocol (IP) network device according to claim 1, the first sequence indicator and the second sequence indicator are numeric characters.

5. A network system comprising:
an internet protocol (IP) network device; and
an internet protocol (IP) network management device;
wherein the internet protocol (IP) network device comprises:
   a detector adapted to detect an event in the network device;
   a generator adapted to generate a trap message comprising event information having information about the detected event;
   a transmitter adapted to transmit, to the internet protocol (IP) network management device, the trap message comprising the event information and a first sequence indicator; and
   a timer adapted to measure a time period from a time at which the transmitter transmits the trap information;
      wherein if the measured time period is equal to or longer than a predetermined time, the generator generates an empty trap message, and
the transmitter transmits, to the internet protocol (IP) network management device, the empty trap message and a second sequence indicator,
   wherein the internet protocol (IP) network management device comprises:
      a receiver adapted to receive, from the internet protocol (IP) network device, the trap message, the empty trap message, the first sequence indicator and the second sequence indicator.

6. The system according to claim 5, wherein the internet protocol (IP) network management device further comprises:
a controller adapted to detect a lost trap based on continuity of the first sequence indicator and the second sequence indicator.

7. The system according to claim 6, wherein the internet protocol (IP) network management device further comprises:
a transmitter adapted to transmit a retransmission request for information about the lost trap.

8. A method of an internet protocol (IP) network device, the method comprising:
detecting an event in the internet protocol (IP) network device;
generating a trap message comprising event information having information about the detected event;
transmitting, to an internet protocol (IP) network management device, the trap message comprising the event information and a first sequence indicator;
measuring a time period from a time at which the transmitter transmits the trap information;
generating an empty trap message if the measured time period is equal to or longer than a predetermined time; and
transmitting, to the internet protocol (IP) network management device, the generated empty trap message and a second sequence indicator.

9. A method of a network system, the method comprising:
detecting an event in the internet protocol (IP) network device;
generating a trap message comprising event information having information about the detected event;
transmitting, to an internet protocol (IP) network management device, the trap message comprising the event information and a first sequence indicator;
receiving, from the internet protocol (IP) network device, the trap message and the first sequence indicator;
measuring a time period from a time at which the transmitter transmits the trap information;
generating an empty trap message if the measured time period is equal to or longer than a predetermined time;
transmitting, to the internet protocol (IP) network management device, the generated empty trap message and a second sequence indicator; and
receiving, from the internet protocol (IP) network device, the trap message and the first sequence indicator, the empty trap message and the second sequence indicator.

* * * * *